United States Patent
Wnenchak et al.

[11] Patent Number: 5,928,414
[45] Date of Patent: *Jul. 27, 1999

[54] CLEANABLE FILTER MEDIA AND FILTER ELEMENTS

[75] Inventors: Raymond M. Wnenchak, Newark, Del.; John E. Bacino, Avondale, Pa.; Stephen K. Stark; Erik H. Wildt, both of Wilmington, Del.

[73] Assignee: W. L. Gore & Associates, Inc., Newark, Del.

[ * ] Notice: This patent issued on a continued prosecution application filed under 37 CFR 1.53(d), and is subject to the twenty year patent term provisions of 35 U.S.C. 154(a)(2).

[21] Appl. No.: 08/749,582

[22] Filed: Nov. 15, 1996

Related U.S. Application Data

[63] Continuation-in-part of application No. 08/680,770, Jul. 11, 1996, abandoned.

[51] Int. Cl.⁶ .......................... B01D 29/21; B01D 29/66; B01D 46/04
[52] U.S. Cl. .................. 95/280; 55/302; 55/304; 55/379; 55/521; 55/528
[58] Field of Search ............... 95/278–281; 55/302–304, 55/378–381, 493, 521, 528

[56] References Cited

U.S. PATENT DOCUMENTS

| | | | |
|---|---|---|---|
| 2,933,154 | 4/1960 | Lauterbach | 55/528 X |
| 3,953,566 | 4/1976 | Gore | 264/288 |
| 3,957,938 | 5/1976 | Gravley | 55/528 X |
| 4,025,679 | 5/1977 | Denny | 55/528 X |
| 4,096,227 | 6/1978 | Gore | 264/210 R |
| 4,187,390 | 2/1980 | Gore | 55/528 X |
| 4,324,574 | 4/1982 | Fagan | 55/528 X |
| 4,830,643 | 5/1989 | Sassa et al. | 55/528 X |
| 4,861,353 | 8/1989 | Wyss | 95/280 |
| 4,877,433 | 10/1989 | Oshitari | 55/528 X |
| 4,878,930 | 11/1989 | Manniso et al. | 55/493 |
| 4,902,423 | 2/1990 | Bacino | 210/500.36 |
| 4,983,434 | 1/1991 | Sassa | 428/36.2 |
| 4,985,296 | 1/1991 | Mortimer, Jr. | 428/220 |
| 5,074,896 | 12/1991 | Baert et al. | 55/379 X |
| 5,096,473 | 3/1992 | Sassa et al. | 55/302 X |
| 5,207,812 | 5/1993 | Tronto et al. | 55/528 X |
| 5,324,579 | 6/1994 | Sassa et al. | 55/528 X |
| 5,368,734 | 11/1994 | Wnenchak | 55/528 X |
| 5,395,429 | 3/1995 | Sutsko et al. | 95/273 |
| 5,414,915 | 5/1995 | Pryne | 55/381 X |
| 5,476,589 | 12/1995 | Bacino | 210/500.36 |
| 5,478,372 | 12/1995 | Stark | 55/528 X |
| 5,527,569 | 6/1996 | Hobson et al. | 55/528 X |

FOREIGN PATENT DOCUMENTS

| | | | |
|---|---|---|---|
| 3-012209 | 1/1991 | Japan | 95/279 |
| 90/08801 | 8/1990 | WIPO . | |
| 95/05555 | 2/1995 | WIPO . | |

*Primary Examiner*—Robert Spitzer
*Attorney, Agent, or Firm*—Carol A. Lewis White

[57] ABSTRACT

A novel filter element is constructed from expanded polytetrafluoroethylene (ePTFE) membrane possessing high strength which is sufficient to withstand filtration processing, as well as permitting the use of low energy to flex and clean the filter element. Further, the novel filter element of the present invention is non-linting and non-contaminating due to the ePTFE membrane structure of the filter, thereby providing excellent filtration performance for a variety of industries requiring high efficiency filtration.

14 Claims, 4 Drawing Sheets

CLEANABLE FILTER MEDIA AND FILTER ELEMENTS

CROSS-REFERENCE TO RELATED APPLICATIONS

The present application is a continuation-in-part of U.S. patent application Ser. No. 08/680,770, filed Jul. 11, 1996, now abandoned.

FIELD OF THE INVENTION

The present invention relates to a novel filter media of expanded polytetrafluoroethylene for use in cleanable filter elements, such as filter bags and cartridges.

BACKGROUND OF THE INVENTION

The removal of particulates from a gas stream has long been a practice in a variety of industrial fields. Conventional means for filtering particulates and the like from gas streams include, but are not limited to, filter bags, filter tubes and filter cartridges. For convenience herein, the term "filter element" will be used to refer collectively to these types of filtration means.

Conventional filtration techniques utilize the filter element to stop particles through the depth of the element, and as the particles build up in and/or on the element, the filtration efficiency of the element is increased. After an amount of dust has caked on the surface of the filter element, the flow rate of gas through the element is reduced to a level where the bulk dust cake must be removed from the element, typically by some form of agitation, such as vibration or the like.

Filter elements are typically constructed from felts and/or fabrics made from a variety of materials, including polyesters, polypropylenes, aramids, glasses and fluoropolymers. Selection of the type of material used is typically based on the gas stream with which the filter element comes in contact, the operating conditions of the system and the type of particulate being filtered.

Polytetrafluoroethylene (PTFE) has demonstrated utility in many areas. As an industrial material, such as a filtration material, for example, PTFE has exhibited excellent utility in harsh chemical environments, which normally degrade many conventional metals and polymeric materials. PTFE is also usable over a broad temperature range, from as high as 260° C. to as low as near −273° C.

However, conventional non-porous PTFE materials possess insufficient porosity to be effective as filtration means, particularly in the case of unexpanded PTFE in sheet form. Alternative means have been developed, such as the formation of woven felts or mats of unexpanded PTFE fibers, whereby particles are trapped between the fibers in the weave. Limitations still exist in these materials, however, due at least in part to the non-porous nature of the PTFE.

A significant development in the area of particle filtration was achieved when expanded PTFE membrane was incorporated as a surface laminate on conventional filter elements. One example is taught in U.S. Pat. No. 4,878,930, directed to a filter cartridge for removing particles of dust from a stream of moving gas or air. Preferred filter media for the cartridge are felt or fabric composites containing a layer of porous expanded polytetrafluoroethylene membrane.

Use of the expanded PTFE membrane greatly enhanced the performance of filter elements because the particles collected on the surface of the expanded PTFE, rather than in the depth of the elements as was occurring in the absence of the expanded PTFE layer. Several significant advantages were observed with these filter elements. First, the filtration efficiency of the elements was high immediately from the outset of the filtration process, and it was not necessary to "build up" a cake of particles to achieve high efficiency. Second, the elements lasted longer because particles were not getting into the backing fabric of the element and rubbing on the fibers to wear them out. Third, the cleaning energy needed to clean the particle cakes off of the elements was lower because the surface of the membrane was smooth and had a lower surface energy.

A filter bag made completely of expanded PTFE is described in U.S. Pat. No. 4,983,434, which shows an expanded PTFE membrane laminated to a felt of carded expanded PTFE staple fiber. This filter bag provides good pulse jet cleaning capabilities due to the strength and flexibility of the expanded PTFE, while also providing good heat resistance, chemical inertness and high air permeability.

In each of the cases described above incorporating expanded PTFE, the filter element comprises a membrane laminated to a backing material which purportedly provides support to the membrane to permit it to withstand the rigors of the filtration and cleaning processing. Conventional teachings in the field of filtration focused on the need for heavier support, or backing, materials to provide more durability to the filter element; however, the use of heavier support materials for higher strength and durability led to a trade-off with blocking more airflow through the filter and requiring more energy to clean the filter element.

For example, laminates weighing up to 22 ounces/square yard (745 g/square meter) were developed which provided longer life, but were heavy, bulky and required more energy to flex or clean the elements. Further drawbacks to such materials included, but were not limited to, high manufacturing costs due to the complex nature of the laminated elements, wear of the bags due to internal stresses between the laminated layers, the need for precision fitting of the elements in the filter assemblies in order to prevent movement of the filter element against the support, resulting in wear, and eventually failure, of the bag, difficulty in achieving effective cleaning, contamination due to particulation of the laminated media, larger quantities of material to dispose of after the filter bags wore out, and the need to accommodate the excess bulk of the laminated filter elements within the design of the filtration assemblies.

The novel filter elements of the present invention are designed to solve these problems and provide significant advantages over the filter elements of the prior art, as described in more detail herein.

SUMMARY OF THE INVENTION

The present invention is directed to expanded polytetrafluoroethylene (ePTFE) membrane which is used as a cleanable filter media and to novel cleanable filter elements incorporating the filter media. The novel filter media and element are based on an unconventional and unexpected approach to solving filtration problems in the filter element industry. Particularly, the discovery that using a filter media of ePTFE membrane alone, which has less overall strength than prior art laminate structures, results in superior performance in cleanable filter elements over existing filter elements made from ePTFE laminated structures and has far-reaching benefits in the field of filtration.

The superior performance of ePTFE membrane alone as the filter media allows extreme flexibility in the use and design of filtration systems. Specifically, because the filter media is made from thin membrane(s) of ePTFE, which is particularly light weight and flexible, air flow through the filter element is very high relative to conventional laminated materials and, accordingly, very low energies are required to dislodge the collected cake from its surface. The ability to use such low amounts of energy to clean the filter element puts very little stress on the membrane, thus resulting in surprising durability and much longer life of the media than would be expected based on the performance of conventional materials. Moreover, the use of membrane of light weight ePTFE material minimizes wear of the material on the filter cages, as compared to conventional laminated materials, and eliminates the presence of induced stresses between layers which exists in conventional laminated structures. In addition, the chemical and temperature resistance of the ePTFE membrane permits the use of the filter element over a wide range of temperatures and chemical environments. Further, the novel filter media of the present invention is non-linting and non-contaminating due to the media being only ePTFE membrane, thereby providing excellent filtration performance for a variety of industries requiring high efficiency filtration. A further added benefit of the present invention is the use of only a small quantity of material in the filter element of the present invention, thus minimizing the quantity of material to be disposed in a worn filter element.

DESCRIPTION OF THE DRAWINGS

The foregoing summary, as well as the following detailed description of the invention, will be better understood when read in conjunction with the appended drawings. For purposes of illustrating the invention, there are shown in the drawings embodiments which are presently preferred. It should be understood, however, that the invention is not limited to the precise arrangements and instrumentalities shown. In the drawings.

DETAILED DESCRIPTION OF THE INVENTION

The present invention is directed to an improved cleanable filter media and improved cleanable filter element constructed from expanded polytetrafluoroethylene (ePTFE) membrane.

The novel filter media of the present invention possesses strength which is sufficient to withstand filtration processing without the requirement for any other layer or component, such as a backing material or the like. Thus, a novel feature of the present invention is the superior performance of ePTFE membrane alone as a cleanable filtration media for use in the novel filter elements of the present invention, as compared to conventional filter elements.

The superior performance of ePTFE membrane in the present invention allows significant flexibility in the use and design of filtration systems. For example, in a preferred embodiment of the present invention, because a filter element is made from a cleanable filter media of ePTFE, air flow through the filter element is very high and, accordingly, very low energies are required to dislodge the collected cake of filtered material from its surface. Moreover, the light weight and flexible nature of the ePTFE membrane allows for a large amount of movement of the media, resulting in very effective removal of the collected cake upon cleaning.

Further, the filter elements of the present invention may be fabricated with universal dimensions which could be adapted to suit a wide variety of filtration system assemblies, thus obviating the need for a large number of filter element configurations tailored to fit the large variety of filter assemblies which currently exist. For example, as mentioned earlier herein, conventional laminated structure filtration media require a very tight fit to the support cage not only to prevent movement, and corresponding wear, of the filter element against the cage, but also to prevent stresses between layers during flexing and cleaning. In this regard, it is believed that the use of a highly flexible, conformable ePTFE filter element which is fitted easily onto a support structure such as a cage or pleated cartridge in such a manner as to allow the element to hang or rest loosely on the structure may facilitate cleaning of the element, provide additional surface area for filtration and reduce the potential for dust collecting in crevices of the support structure.

The ability to use low energies to clean the filter element puts very little stress on the membrane, thus resulting in surprising durability and longer life of the element than would be expected based on the performance of conventional materials. Suitable cleaning methods of the present invention include, but are not limited to, vibration, back pulsing, reverse air cleaning, sonic cleaning and shaking. Moreover, the ability to use lower energies for cleaning of the filter assemblies may permit filtration system designers significant flexibility in designing more effective, lower energy filtration systems.

A further benefit of the present invention is the chemical and temperature resistance of the ePTFE membrane, which permits the use of the filter media and filter element over a wide range of temperatures and chemical environments. In addition, the natural lubricity and the extremely light weight of the ePTFE membrane further reduce the wear of the filter element on the support structure. Further, the novel filter media of the present invention is non-linting and non-contaminating due to the media being only ePTFE membrane structure, thereby providing excellent filtration performance and low contamination for a variety of industries requiring high efficiency filtration.

A further added benefit of the present invention is the use of a small quantity of material in the filter element of the present invention as compared to laminated structures, thus reducing the quantity of material to be discarded in a worn filter element. The novel ePTFE filter elements of the present invention typically occupy only 10% of the volume of conventional laminated filter element materials and weigh on average 80% less than such conventional materials. For example, an average ePTFE media of the present invention typically weighs about 30–40 g/square meter, as compared to about 400 g/square meter for a conventional lightweight polyester laminate filter media. Moreover, corresponding savings in shipping and handling may also be realized for the present materials.

The novel filtration media of ePTFE membrane used to fabricate the filter elements of the present invention exhibits high air flow coupled with high ball burst strength. A preferred ePTFE filter element material of the present invention is made in the following manner. A fine powder PTFE resin is blended with a lubricant, such as odorless mineral spirits, until a compound is formed. The volume of lubricant used should be sufficient to lubricate primary particles of the PTFE resin so as to minimize the potential of the shearing of the particles prior to extruding.

The compound is then compressed into a billet and extruded, such as through a ram type extruder, to form a coherent sheet of extrudate. A reduction ratio of about 30:1 to 300:1 may be used (i.e., reduction ratio=cross-sectional area of extrusion cylinder divided by the cross-sectional area of the extrusion die). For most applications a reduction ratio of 75:1 to 100:1 is preferred.

The lubricant may then be removed, such as through volatilization, and the dry coherent extrudate sheet is expanded rapidly in at least one direction about 1.1 to 50 times its original length (with about 1.5 to 2.5 times being preferred). Expansion may be accomplished, such as through the method taught in U.S. Pat. No. 3,953,566, by passing the dry coherent extrudate over a series of rotating heated rollers or heated plates at a temperature of between about 100 and 325° C. Alternatively, the extruded sheet may be expanded in the manner described in U.S. Pat. No. 4,902,423, to Bacino, prior to removal of the lubricant. In a further alternative embodiment, the extruded sheet may be expanded in the manner taught in U.S. Pat. No. 5,476,589, to Bacino. The subject matter of each of these patents is specifically incorporated herein by reference.

In a preferred embodiment, the material may be further expanded at a ratio of 1:1.1 to 50:1, with 5:1 to 35:1 being preferred, to form a final microporous sheet. Preferably the sheet is biaxially expanded so as to increase its strength in both its longitudinal and transverse directions. Finally, the material may be subjected to an amorphous locking step by exposing it to a temperature in excess of 340° C.

The material of the present invention is preferably made in the form of sheets, which, due to their inherent flexibility, may be formed into a wide variety of other shapes as desired, such as tubes, strips, convex or concave structures, etc. Additionally, to address particular applications, the material of the present invention may likewise be extruded or otherwise formed into continuous tubes, rods (i.e., cylinders), rectangles, uneven shapes and other structures that may be of interest.

Sheets made from the above processing steps can be produced in thicknesses ranging from, but not limited to, 0.01 mm to 2 mm. Sheets may also be subsequently layered upon themselves and subjected to temperatures ranging from about 300° C. to 400° C. while applying sufficient pressures to bond the layers together.

Figure 1:
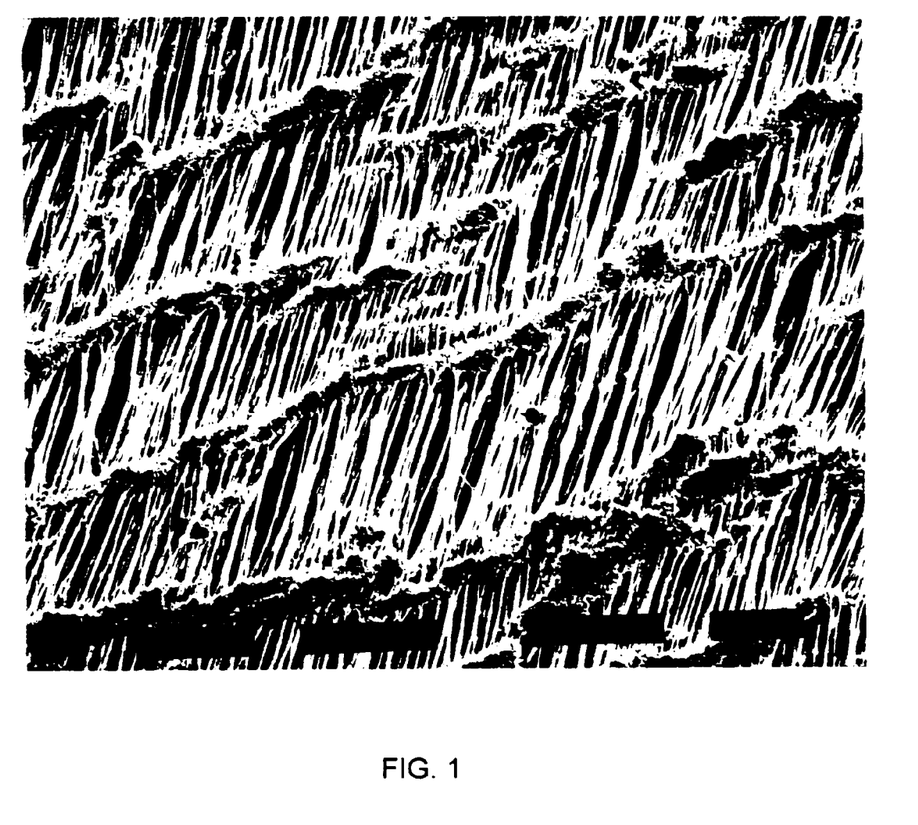
FIG. 1 is a photomicrograph of an ePTFE membrane formed in the present invention at 1000× magnification.

Referring to FIG. 1, a micrograph of the ePTFE membrane of the present invention is depicted in cross-section at a magnification of 1000×. As is clearly shown in FIG. 1, the ePTFE membrane of the present invention has a microstructure characterized by elongated nodes interconnected by fibrils arranged in sheaths of parallel stria. These sheaths of parallel stria are arranged generally in the direction of longitudinal expansion. The fibrils appear coarse in nature, and the elongated nodes are arranged substantially perpendicular to the direction of longitudinal expansion. The porosity of the material may be 1 Frazier or higher, and the Ball Burst Strength of the material may range from 3 to 50 pounds, preferably 12 to 18 pounds.

The ePTFE membrane may be filled with various fillers presently used to fill expanded microporous PTFE, as is taught in U.S. Pat. No. 4,096,227 to Gore and U.S. Pat. No. 4,985,296 to Mortimer, Jr., incorporated herein by reference. Suitable particulate fillers may include, for example, inorganic materials such as metals, semi-metals, metal oxides, glass, ceramics, and the like. Alternatively, other suitable particulate fillers may include, for example, organic materials selected from activated carbon, carbon black, polymeric resin, and the like. Moreover, if conductive filler is used to fill the ePTFE membranes and is present in a sufficient amount, the ePTFE may exhibit static dissipative or conductive properties, and ePTFE filter elements produced from such ePTFE membranes may be static dissipative or conductive in nature as well.

The term "static dissipative" as used herein is intended to include any material with a volume resistivity of less than $10^9$ and greater than $10^2$ ohm cm as determined by ASTM D 257-90. The term "conductive" as used herein is intended to include any material having a volume resistivity of $10^2$ ohm cm or less as determined by ASTM D 257-90. "Particulate" is defined herein to mean individual particles of any aspect ratio including powders, fibers, etc.

Figure 2A:
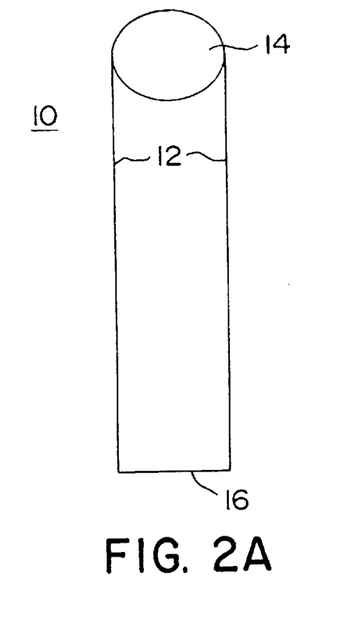
FIGS. 2A and 2B are embodiments of filter bags formed in accordance with the present invention.
Figure 2B:
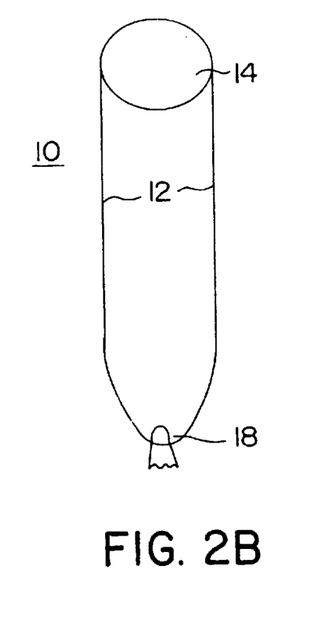

The filter elements of the present invention may be fabricated using any number of conventional ePTFE shaping and/or bonding techniques. In a preferred embodiment of the present invention, the filter element can be fabricated by welding sheets of ePTFE membrane along an edge or seam, with no requirement for stitching or sealing as required with conventional laminated filter elements. For example, as shown in FIG. 2A, a filter element 10 may be fabricated by stacking two sheets of ePTFE membrane one on top of the other, and the edges 12 and bottom 16 may be sealed by welding, leaving an opening 14 to permit placement of the filter element 10 onto a support cage. Further, in another embodiment, as shown in FIG. 2B, the filter element 10 may be fabricated in the shape of a tube by welding the side seams 12 and leaving both ends open, whereby one end 14 is affixed to the support cage and the other end 18 is closed off by tying the membrane in a knot.

Support structures which may optionally be used in the filter elements of the present invention can vary widely depending on a number of conditions, including the configuration of the filter element, the type of material to be filtered, the filtration system into which the filter element will be incorporated, and the like. For example, suitable support structures for use in the present application include cages, pleated structures such as cylindrical cartridges, rectangular panels, and the like, and may be fabricated from materials such as metals, plastics, and natural fibers, including woven or nonwoven forms, such as spunbonded polyester, NOMEX® nonwoven aramid felt materials, metal or plastic meshes, or the like.

Figure 3A:
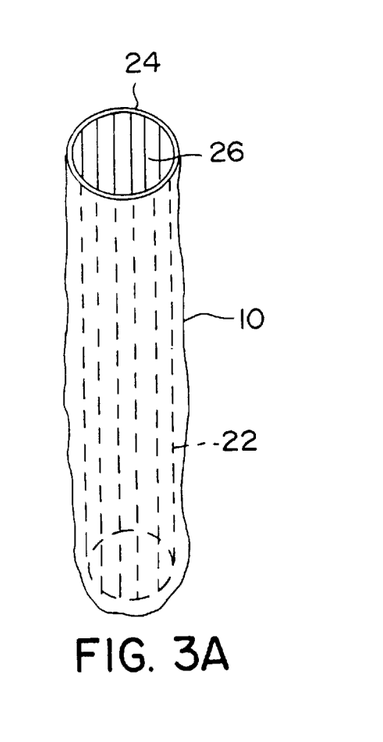
FIGS. 3A and 3B show a filter bag assembly incorporating a filter bag prior to and during filtration, respectively, in accordance with the present invention.
Figure 3B:
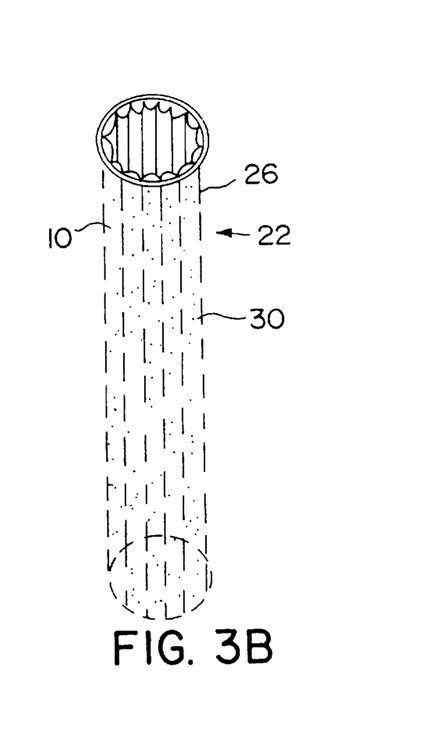
Figure 4:
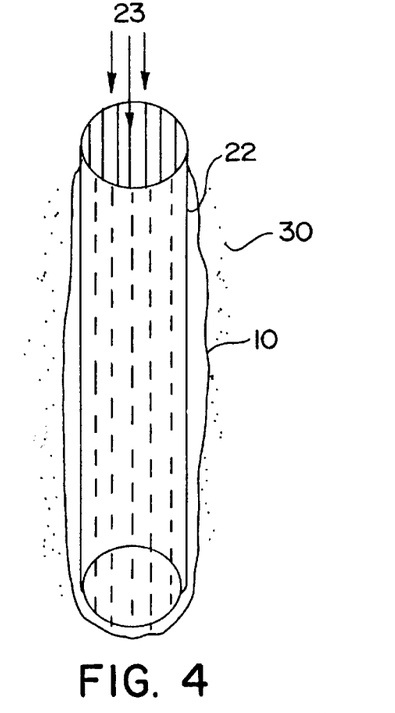
FIG. 4 is th e filter bag assembly of FIGS. 3A and 3B showing the filter bag upon flexing or cleaning during operation of the filtration assembly.

FIG. 3A shows a filter bag 10 of the present invention assembled onto a support cage 22 having support ribs 26 by an attachment means, such as attachment ring 24. FIG. 3B shows the filter bag 10 of FIG. 3A as it appears during a typical filtration operation. As a vacuum or other means is created to move gas through the filter bag 10 to filter out particulate 30, the filter bag 10 is pulled or pushed inward between the support ribs 26 of the support cage 22. FIG. 4 shows the filter bag 10 of FIGS. 3A and 3B during a pulse cleaning operation. Specifically, during cleaning, gas 23 to be passed through the filter in the direction depicted by the arrow is moved through the filter bag 10 in a direction opposite the flow of gas maintained during filtration, and the filter bag 10 is blown away from the support cage 22, thus inducing the particulate 30 to fall off of the filter bag 10.

While the present figures demonstrate specific embodiments of filtration elements and assemblies, it is contemplated that any comparable filtration technique, such as providing air flow in directions opposite to those embodiments shown, would be encompassed by the present invention.

Figure 5A:
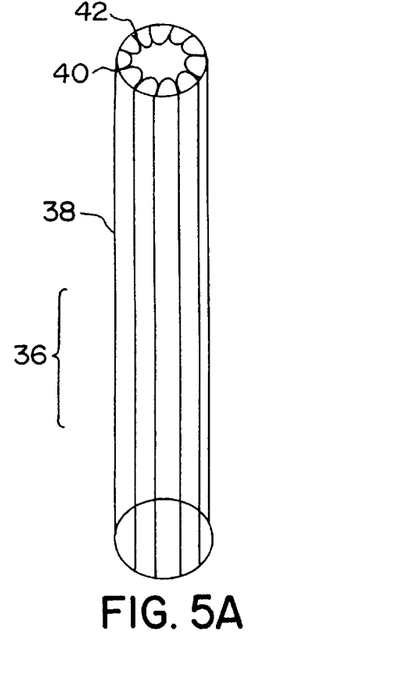
FIGS. 5A and 5B show a filter cartridge of the present invention during filtration and cleaning, respectively.
Figure 5B:
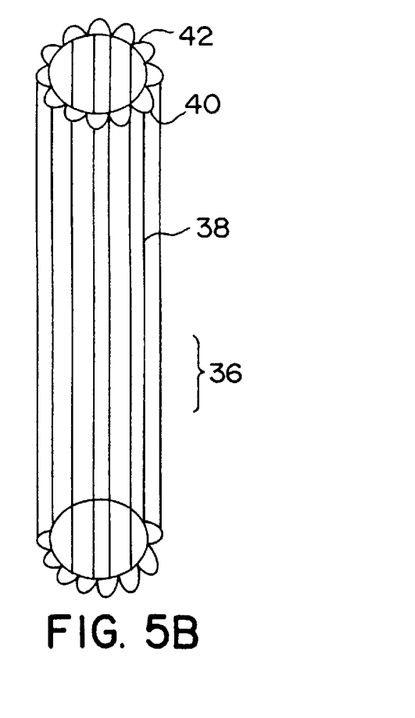
Figure 5C:
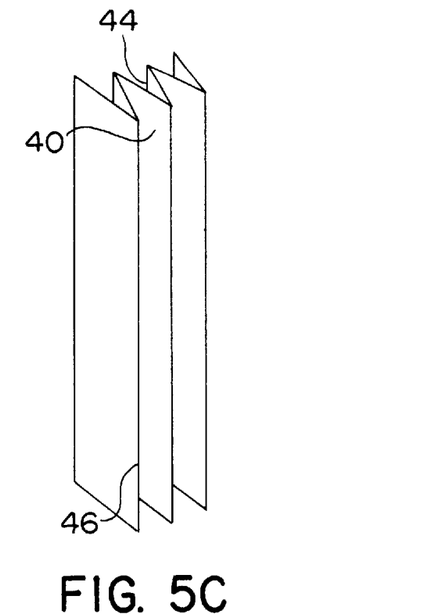
FIGS. 5C and 5D show a perspective view of a portion of a filter cartridge of the present invention during filtration and cleaning, respectively.
Figure 5D:
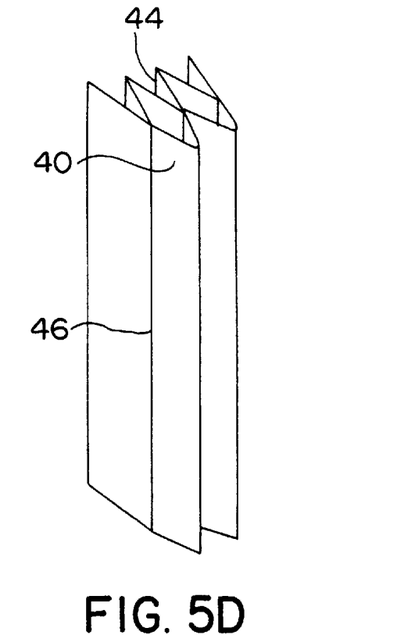

Alternative geometries which may be desirable for the filter elements of the present invention include incorporating the media into a filter cartridge. FIGS. 5A and 5B show a filter cartridge of the present invention, wherein a support cage 36 with vertical members 38 is provided and the media 40 is pleated between the vertical members. The media 40 is affixed, such as by use of an adhesive, by welding, or by any other suitable means, to the vertical members 38, creating the pleat tips 42. Particularly preferred vertical members comprise a material that would readily allow adhesion of the media, although other materials may be used with alternative adhesion means. In this embodiment, the pleats are extremely flexible, thus allowing complete inversion of the pleat during filtration, as shown in FIG. 5A, and during cleaning, as shown in FIG. 5B. Thus, the pleats move from a concave orientation during filtering to a convex orientation during cleaning, or vice versa depending on the construction of the filter assembly. FIGS. 5C and 5D show a perspective view of a portion of a filter cartridge, comprising a pleated support member 44 during filtering and cleaning, respectively, wherein the media 40 is attached to the pleat tips 46 of the pleated support member 44. As with FIGS. 5A and 5B, upon filtering and cleaning the media 40 moves from a concave position during filtering to a convex position during cleaning, or vice versa depending on the filter assembly construction. The ability to create such convex and concave pleats provides added surface area during filtering, thus enhancing filtration performance of a filter, and complete cleaning of the pleat depth during cleaning.

Preferred means for adhering the filter media to the support structure include, but are not limited to, adhering by the use of a suitable adhesive, welding or fusing the media to the structure, and attaching a rod, wire, thread or other mechanical retainer which secures the media to the structure similar to the method described in U.S. Pat. No. 4,878,930, discussed earlier herein. Suitable adhesives may include hot melt polyimides, RTV silicones, epoxies, polyurethanes, and the like.

In an alternative preferred embodiment of a filter cartridge assembly of the present invention, the filter media may be held in place against a support structure or attached directly to a support structure comprising, for example, a pleated woven or nonwoven material, such as a spunbonded polyester or NOMEX® nonwoven felt material, metal or plastic mesh, or the like. In this embodiment, the filter media may be attached to the support structure in any number of configurations, depending on the desired performance of the filter.

In a first alternative configuration of this embodiment of the present invention, the filter media may be held against the support structure by providing any one of cages, frames, straps, belts, or any other external means which holds the filter element in contact with at least a portion of the support structure. The external means may comprise metal, plastic, fabric, or any other material which is compatible with the filtration operation, and may be attached to the assembly with or without an adhesive material.

Figure 6A:
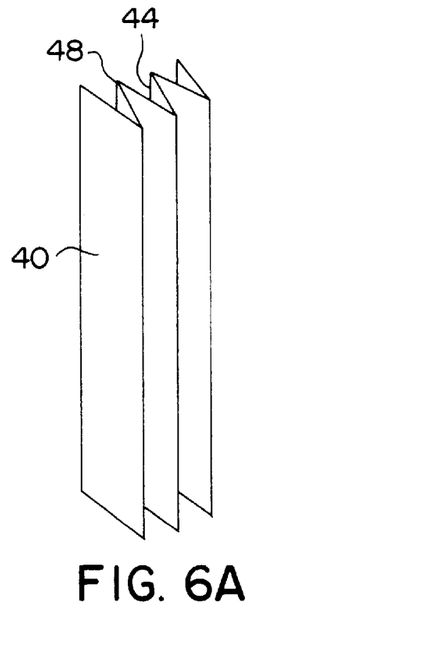
FIGS. 6A and 6B show a further embodiment of a filter cartridge of the present invention during filtration and cleaning, respectively.
Figure 6B:
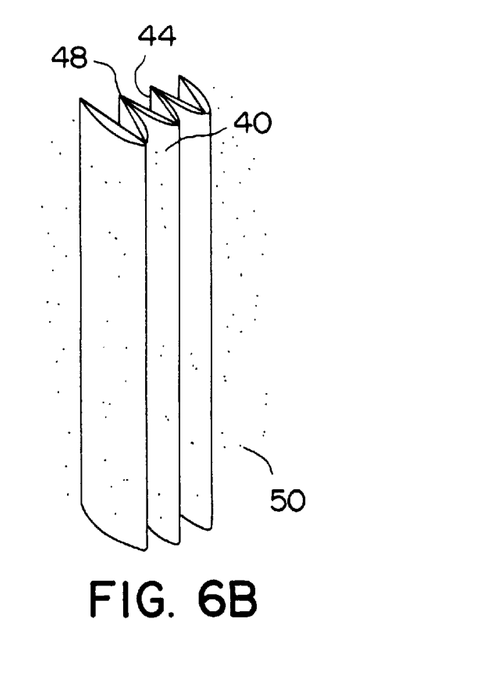

In a second alternative configuration of this embodiment, the filter media may be attached to the outer or inner folds of the pleated support structure through the use of an adhesive, by fusing, or the like. Similar to the configuration mentioned above with respect to FIGS. 5A and 5B, the attachment of the filter media to the outer folds of the support structure permits complete inversion of the pleats during filtration and cleaning. Alternatively, the filter media may be attached to the inner folds of the support structure. FIG. 6A shows a filter cartridge of the present invention comprising a pleated support structure 44 having a filtration media 40 attached to the inner folds 48 of the pleated structure 44. FIG. 6B is a representative view of the structure on cleaning, whereby the filtration media 40 is flexed away from the surface of the pleated structure 44 to induce the filtrate 50 to separate from the filtration media 40. In this configuration, while the filter media is held in closer contact with the support structure than when attached to the outer folds, the unattached portions of the media are free to pulse away from the surface of the support structure during cleaning, while avoiding wrinkling or folding during the filtering and cleaning operations.

In a third alternative configuration of this embodiment, the filter media may be affixed to a portion of the surface of the support structure by discontinuously bonding the media to the surface of the support structure. For example, the discontinuous bond may be in the form of vertical or horizontal lines, a gravure printed pattern, or any other configuration whereby the media is attached to the support structure by fusing or adhering the media to the support structure. Filter cartridges fabricated in this manner provide enhanced filtration due to the ability to flex or pulse the unattached portions of the membrane away from the surface of the support structure during cleaning, while maintaining the overall positioning of the filter media on the support structure without folding or bunching of the membrane during the filtration and cleaning operations.

In a further embodiment of the present invention, in certain industries where even small defects or holes in a filter bag may result in particularly detrimental contamination, it may be desirable to provide multiple layers of filter media in the filter element (for example, "double bagging" in the case of a filter bag assembly) to ensure that failure of a filter element does not occur.

TEST METHODS

Ball Burst Strength

This test measures the relative strength of a sample of media by determining the maximum load at break. The media is challenged with a 1 inch (2.54 cm) diameter ball while being clamped between two plates. The Chantillon, Force Gauge/Ball Burst Test was used.

The media is placed taut in the measuring device and pressure affixed by raising the web into contact with the ball of the burst probe. Pressure at break is recorded.

Air Permeability—Frazier Number Determination

Air permeability of materials are determined according to test methods entitled ASTM D 737-75, "Standard Test Method for AIR PERMEABILITY OF TEXTILE FABRICS."

Differential Scanning Calorimetry

Thermal analysis of a sample is determined through the use of a Differential Scanning Calorimeter. Approximately 10 mg of sample is placed into the Differential Scanning Calorimeter and the temperature of the sample is increased from room temperature (approximately 21° C.) at a scan rate of 10° C./min.

The following examples are presented to further explain the teachings of the instant invention and are not intended to limit the scope of the present invention. Various modifications and equivalents will readily suggest themselves to those of ordinary skill in the art without departing from the spirit and scope of the present invention.

EXAMPLE 1

A filter bag of the present invention was produced in the manner described below.

A fine powder PTFE resin was combined with a quantity of an odorless mineral spirit and mixed until a paste was formed. The paste was compressed under a vacuum to form a billet, and the billet was subsequently extruded through a die, thereby forming a coherent PTFE extrudate.

The coherent PTFE extrudate was compressed between a pair of rollers until a coherent PTFE sheet measuring 0.51 mm thick was obtained. The coherent PTFE sheet still contained an amount of the odorless mineral spirit.

The odorless mineral spirit was volatilized from the coherent PTFE sheet yielding a dry, coherent PTFE sheet by passing the PTFE sheet over a series of rollers heated above the boiling point of the odorless mineral spirit but below the melting point of the PTFE resin.

The dry coherent PTFE sheet was subsequently expanded longitudinally in two passes over a series of three curved heated plates. In the first pass, each of the plates was heated to a temperature of 300° C., and the dry coherent PTFE sheet was passed onto the first plate at a rate of 7.62 m/min. On the first plate, the dry coherent PTFE sheet was expanded at a ratio of 2:1. On the second plate, the dry coherent PTFE sheet was expanded at a ratio of 8:1, and on the third plate the sheet was allowed to contract by 60% in length.

In the second pass, the dry coherent PTFE sheet was fed onto the first plate at a rate of 7.62 m/min., and the PTFE sheet was expanded on the first plate at a ratio of 3:1 while the plate was heated to a temperature of 300° C. On the second plate, the sheet was expanded at a ration of 2:1 while the plate was heated to a temperature of 335° C. On the final plate, the sheet was expanded at a ratio of 1.11:1 while the plate was heated to a temperature of 360° C., a temperature above the crystalline melting point of the PTFE resin. The result was a substantially amorphously locked longitudinally expanded PTFE membrane.

The membrane was subsequently expanded in the transverse direction at a ratio of 2:1 at a set point temperature of about 365° C. The result was a porous membrane measuring 40 cm wide with a 50 Frazier number and a Ball Burst strength of 4.15 pounds.

The membrane was then cut into two sheets measuring 2.4 m (8 feet) in length and 17.2 cm (6.78 inches) wide. The sheets were laid one on top of the other and placed in a Vertrod Wire Welder Model 72E WB-HOV. The welder was brought down on one 2.4 m (8 foot) long edge of the stacked membranes to create a pressure of 80 psi at a temperature of about 350° C. for one second. The welder was maintained in place on the membranes until the welder cooled down to about 150° C., and then it was removed. The other 2.4 m (8 foot) edge of the stacked membrane was then sealed in the same manner. One end of the tube was then sealed in the same manner. The other end was left open so a support cage could be inserted into the formed filter bag. For installation of the filter bag, the open end was adapted to be press fit into a tube sheet hole.

EXAMPLE 2

A filter bag of the present invention was produced in the manner described below.

A dry coherent PTFE extrudate was produced as in Example 1. The dry coherent PTFE sheet was subsequently expanded in two passes over a series of three curved heated plates. The first pass was performed as described in Example 1.

In the second pass, the dry coherent PTFE sheet was fed onto the first plate at a rate of 10.67 m/minute and expanded at a ratio of 2:1 while the first plate was heated to a temperature of 300° C. On the second plate, the sheet was expanded at a rate of 2:1 while the plate was heated to a temperature of 335° C. On the final plate, the sheet was expanded at a rate of 1.11:1 while the plate was heated to a temperature of 360° C., a temperature above the crystalline melting point of the PTFE resin. The result was a substantially amorphously locked longitudinally expanded PTFE membrane.

The membrane was subsequently expanded in the transverse direction at a ratio of 2:1 at a set point temperature of about 365° C. The result was a porous membrane measuring 40 cm wide with a 30 Frazier number and a Ball Burst strength of 5.18 pounds.

The resulting membrane was then formed into a filter bag in the same manner as described in Example 1.

EXAMPLE 3

A membrane was formed substantially in accordance with Example 1.

The membrane was then bonded to a 20 wire round cage measuring 76 cm (30 inches) high in the following manner. The vertical wires of the cage were coated with a thermoplastic tubing. The membrane was then welded to each of the wires with excess material pleated in about 2.54 cm (1 inch) between the wires of the cage. Excess material at the bottom of the cage was gathered and taped, thus sealing the bottom. The excess material at the top of the cage was gathered, taped and sealed in a similar manner. In this configuration, the filter element took the form of a pleated cartridge in which the pleats were free to completely invert during the cleaning cycle.

EXAMPLE 4

A pleated filter cartridge of the present invention was produced in the following manner: A 40 cm wide web of membrane formed substantially in accordance with Example 1, was unrolled on top of a 40 cm wide web of Axtar spunbonded polyester (270 grams/sq. m), available from Toray Industries. The two layers were pleated together into a pleat pack consisting of 35 pleats at a pleat depth of about 25.4 mm. The pleat pack was compressed together as it was placed, with the membrane facing down, on a hot plate with a surface temperature of about 260° C. The pleat tips were pushed down on the hot plate for about 15 seconds, then removed and allowed to cool. In this process the polyester fibers at the pleat tips melted and formed a strong bond with the PTFE membrane along the edge of each pleat.

This pleat pack design was then formed into a filter cartridge by bonding the end pleats of spunbonded polyester together with polyamide hot melt adhesive, to form a cylindrical pleat pack. The loose membrane from the last pleat was sealed over the seam using a bead of RTV silicone (General Electric RTV 118). The 40 cm long cylindrical pleat pack was then placed around a 40 cm long center core made from perforated galvanized steel. The assembly was then potted into galvanized steel end-caps with an outside diameter of 141 mm. The potting compound was a PVC plastisol available from Dennis Chemical Company (St. Louis, Mo.) which was hardened by setting the filter assembly onto a hot plate with a surface temperature of about 190° C. for about 20 minutes.

EXAMPLE 5

A pleated filter cartridge of the present invention was produced in the following manner: A pleated pack was produced with the membrane bonded to the back of the pleat by applying a 4 mm wide bead of RTV silicone adhesive/sealant (General Electric RTV 118), along the bottom of the spunbonded polyester pleats. The membrane was then attached after applying the silicone, by pushing the membrane web down into the back of each pleat with a thin plastic rod, contacting the silicone at the back of the pleat. The silicone was allowed to cure for 24 hours.

This pleat pack design was then formed into a filter cartridge by bonding the end pleats of spunbonded polyester together with polyamide hot melt adhesive, to form a cylindrical pleat pack. The loose membrane from the last pleat was sealed over the seam using a bead of RTV silicone (General Electric RTV 118). The 40 cm long cylindrical pleat pack was then placed around a 40 cm long center core made from perforated galvanized steel. The assembly was then potted into galvanized steel end-caps with an outside diameter of 141 mm. The potting compound was a PVC plastisol available from Dennis Chemical Company (St. Louis, Mo.) which was hardened by setting the filter assembly onto a hot plate with a surface temperature of about 190° C. for about 20 minutes.

While particular embodiments of the present invention have been illustrated and described herein, the present invention should not be limited to such illustrations and descriptions. It should be apparent that changes and modifications may be incorporated and embodied as part of the present invention within the scope of the following claims.

The invention claimed is:

1. A method of cleaning a cleanable filtration media comprising:

providing a cleanable filter element comprising a support structure having a plurality of longitudinal members and a filtration media consisting of expanded PTFE membrane attached to at least a portion of said longitudinal members, thereby forming a plurality of pleat tips with filtration media between the pleat tips;

installing said cleanable filter element in a gas filtration system such that during filtering of gas said media is positioned between adjacent pleat tips in a concave orientation with respect to the direction of filtering, so that filtrate from the gas collects on the concave side of the media;

inducing a reverse gas pulse in the direction opposite the direction of filtering to invert the filtration media in a convex orientation beyond the pleat tips so that the filtrate separates from the filtration media.

2. A method of cleaning a cleanable filtration media comprising:

providing a cleanable filtration media consisting of expanded PTFE membrane having a first side and a second side, whereby gas to be filtered passes into the first side of the media, through the media and out the second side of the media, so that filtrate from the gas collects on the first side of the media;

attaching said cleanable filtration media to a support structure comprising a pleated material having outer and inner folds, said attachment comprising attaching said filtration media to at least one outer fold of said pleated material, so that portions of the filtration media between the at least one outer fold are not attached;

agitating said cleanable filtration media to induce the regions between the attachment of the at least one fold to flex in response to the agitation, thereby inverting the filtration media;

wherein the agitation of the filtration media induces the filtrate to separate from the first side of the filtration media.

3. The method of claim 2, wherein said filtration media includes two layers of expanded PTFE.

4. The method of claim 2, wherein said pleated material comprises at least one of a woven material and a non-woven material.

5. The method of claim 4, wherein said pleated material comprises said nonwoven material selected from the group consisting of spunbonded polyester and nonwoven aramid felt.

6. In a gas filtration system that separates solids from a gas stream, said gas filtration system being cleanable by a reverse gas pulse, a cleanable filter element comprising:

a support structure having a plurality of longitudinal members;

a filtration media comprising expanded PTFE membrane attached to at least a portion of said longitudinal members, thereby forming a plurality of pleat tips with filtration media between the pleat tips, whereby when used in said gas filtration system, during filtering said media is positioned between adjacent pleat tips in a concave orientation with respect to the direction of filtering and during reverse gas pulse cleaning of said filter element the media is inverted in a convex orientation beyond the pleat tips.

7. The gas filtration system of claim 6, wherein said plurality of longitudinal members comprises at least one of outer folds and inner folds of a pleated support structure.

8. The gas filtration system of claim 6, wherein said filtration media is attached to said longitudinal members by a mechanical retainer comprising at least one component selected from the group consisting of at least one cage, at least one frame, at least one strap, and at least one belt.

9. The gas filtration system of claim 8, wherein said mechanical retainer comprises at least one material selected from the group consisting of metal, plastic and fabric.

10. The gas filtration system of claim 6, wherein said filtration media is attached to said support structure by an adhesive comprising at least one material selected from the group consisting of hot melt polyimide, RTV silicone, epoxy and polyurethane.

11. The gas filtration system of claim 6, wherein said filtration media is attached to said support structure by a discontinuous bond between said filtration media and said support structure.

12. The gas filtration system of claim 11, wherein said discontinuous bond comprises a pattern selected from the group consisting of a gravure printed pattern, and a line pattern.

13. The gas filtration system of claim 6, wherein said filtration media includes two or more layers of expanded PTFE.

14. In a gas filtration system that separates solids from a gas stream, said gas filtration system being cleanable by a reverse gas pulse, a cleanable filter element comprising:

a support structure having a plurality of longitudinal members;

a filtration media consisting essentially of expanded PTFE membrane attached to at least a portion of said longitudinal members, thereby forming a plurality of pleat tips with filtration media between the pleat tips, whereby when used in said gas filtration system, during filtering said media is positioned between adjacent pleat tips in a concave orientation with respect to the direction of filtering and during reverse gas pulse cleaning of said filter element the media is inverted in a convex orientation beyond the pleat tips.

* * * * *